SECRECY TELEVISION SYSTEM WITH FALSE SYNCHRONIZING SIGNALS

Filed Aug. 26, 1963 2 Sheets-Sheet 1

INVENTOR
Patrick Bass
By Holcombe, Wetherill & Brisebois
ATTORNEYS

INVENTOR
Patrick Bass
By Holcombe, Wetherill & Brisebois
ATTORNEYS

United States Patent Office 3,313,880
Patented Apr. 11, 1967

3,313,880
SECRECY TELEVISION SYSTEM WITH FALSE SYNCHRONIZING SIGNALS

Patrick Bass, London, England, assignor to R. & R. Research Limited
Filed Aug. 26, 1963, Ser. No. 304,587
Claims priority, application Great Britain, Aug. 30, 1962, 33,385/62
7 Claims. (Cl. 178—5.1)

This invention relates to television transmitting and receiving apparatus. The invention is particularly applicable to either radio or wired television systems in which a television signal is transmitted for satisfactory reception only by viewers having a suitable receiving apparatus and who have satisfied or have agreed to meet a demand by the organiser of the television system for a fee in respect of such reception. In other words the television signals of this system do not provide satisfactory reception when received by viewers not having a suitable receiving apparatus and/or who have not met the organiser's fee demand. Television systems of this general kind are sometimes known as subscription television systems.

According to one aspect of the invention there is provided a television apparatus comprising a transmitting apparatus including means to transmit video signals and synchronising signals for the video signals, a receiving apparatus including an equipment adapted to respond to applied video signals and synchronising signals for said applied video signals, said applied synchronising signals being of predetermined nature and occurring at predetermined intervals of time, means at the transmitter for transmitting at said predetermined intervals synchronising signals of other than the said nature, and for transmitting signals not having video synchronisation significance but having said nature at other than said intervals, said receiving apparatus including also means to convert the transmitted synchronising signals to synchronising signals of said predetermined nature and time intervals for application to said receiving equipment.

According to another aspect of the invention there is provided a television transmitting apparatus including means to generate video signals and synchronising signals at regular intervals for the video signals, means responsive to the video signals attaining black level to generate signals not having video synchronisation significance, means to combine the signals with the two latter signals lying in the blacker than black amplitude range of video signals, and means to transmit the combined signal.

According to a further aspect of the invention there is provided a television receiving apparatus including equipment adapted to respond to video signals and synchronising signals for the video signals being D.C. pulses occurring at predetermined intervals of time and lying in the blacker than black amplitude range of the video signals, and means to convert received sinusoidal voltage bursts in the blacker than black range to unidirectional synchronising pulses and to reject received D.C. blacker than black pulses.

Yet a further aspect of the invention provides a television receiving unit for use with a television receiver equipped to respond to video signals and synchronising signals being D.C. pulses lying in the blacker than black range of the video signals, including means to deliver a unidirectional synchronising pulse on reception of a sinusoidal voltage burst in the blacker than black range in received television signals and to reject a blacker than black pulse received.

Further features and advantages of the invention will become apparent from the following description of one particular embodiment thereof, given by way of example only, with reference to the accompanying drawings in which.

The embodiment of the invention described in relation to the drawings is applicable to a television system in which the synchronizing signals occupy an amplitude range adjacent to that occupied by the video signals in the black-going direction. It is believed that the modifications necessary to adapt the invention to systems such as that standard in the United States of America in which the amplitude range occupied by the synchronizing signals is adjacent to that of the video signals in the white-going direction will be obvious to those skilled in the art.

Figure 1:
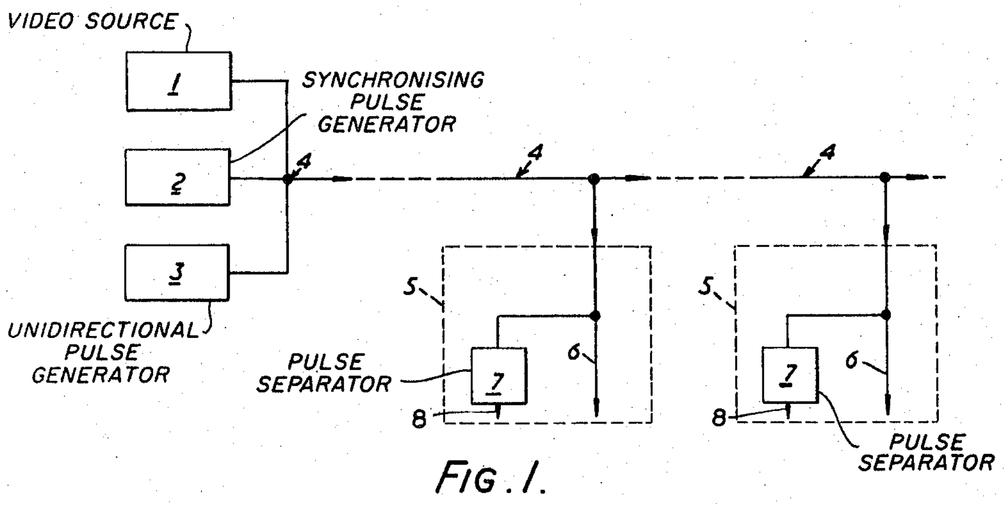
FIGURE 1 is a block schematic diagram of a television system apparatus in accordance with the present invention.

In the system shown in FIGURE 1 the transmitting apparatus comprises a video signal source 1, such for example as a television camera, which provides signals representative of a scene to be transmitted. This apparatus also comprises a synchronising pulse generator 2 arranged to provide synchronising pulses of which at least the line synchronising pulses are in the form of bursts of sinusoidal voltage and a unidirectional voltage pulse generator 3 for producing direct current pulses intermediate the occurrence of the line synchronising pulses. The output signals from the video source 1 and the pulses from the generators 2 and 3 are applied to a signal path 4 which may be either a radio or wired path as desired.

This system comprises two receiving means 5 each of which is adapted to respond to signals transmitted by the said transmitting apparatus. Each receiving means 5 provides video signals from source 1 and pulses from the generators 2 and 3 on the line 6 from which picture signals are fed to a display device (not shown), such for example as a cathode ray tube. The signals on the line 6 are also fed to a pulse separator 7 which is arranged to separate the synchronising and unidirectional voltage pulses from the video signals and to provide an output signal on its output line 8 in response to each pulse applied to it which comprises a burst of sinusoidal voltage, the unidirectional voltage pulses being ineffective to produce an output signal on the line 8.

Figure 2:
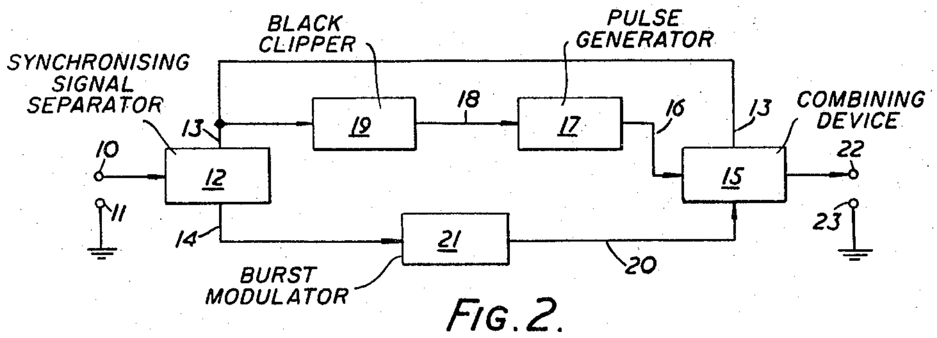
FIGURE 2 is a block schematic diagram of a transmitting apparatus suitable for use in the system of FIGURE 1.

A transmitting apparatus suitable for use in the system shown in FIGURE 1 will now be described in greater detail in connection with FIGURE 2. In this apparatus the input terminals 10, 11 are arranged to receive a television signal of standard waveform and having video information signals and synchronising pulses. Television signals applied between the terminals 10, 11 are fed to a picture/synchronising signal separator 12 which provides the picture signals on the line 13 and the synchronising signals on the line 14. The picture signals on the line 13 are fed directly to a combining device 15 in which they are combined with two types of pulses, namely unidirectional voltage pulses and bursts of sinusoidal voltage respectively.

The unidirectional voltage pulses are applied to the combining device 15 over the line 16 from a unidirectional voltage pulse generator 17. This pulse generator 17 is arranged to produce a pulse in response to a triggering signal applied over the line 18 from a black clipper 19 which has applied to it the picture signals on the line 13 and is arranged to produce an output signal on the line 18 when the level of the picture signal is representative of black. The pulses which comprise bursts of sinusoidal voltage are applied to the combining device 15 over the line 20 from a burst modulator 21. This burst modulator 21 is arranged to produce a burst of sinusoidal voltage in response to each synchronising pulse applied to it over the line 14.

The signals combined by the combining devices 15 are made available between the output terminals 22, 23 from which they may be taken to effect modulation of a high frequency carrier wave, for example in the range 4–10 mc./s. for transmission over a wired broadcasting network or to effect modulation of a suitable high frequency carrier wave, for example in any one of the television bands I, III, IV or V, for radio transmission.

The operation of the apparatus shown in FIGURE 2 will be made clearer by reference to FIGURES 4*a* and 4*b*. Both these figures show the waveforms of television signals in which increasing amplitudes denote increasing brightness, i.e. maximum signal amplitude representing white. Black is represented by 30% maximum amplitude, the synchronising pulses occupying the signal amplitude range between 0% and 30%.

Figure 4A:
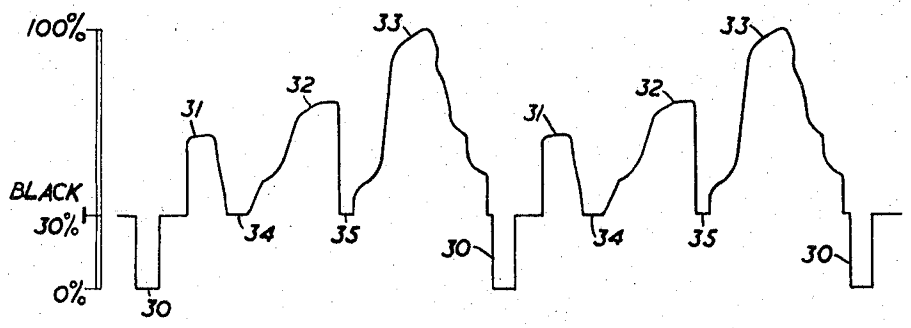
FIGURES 4*a* and 4*b* show waveforms useful in understanding the operation of the arrangements shown in FIGURES 1 to 3.

In FIGURE 4*a* two lines of the television signal are shown between three lines synchronising pulses 30. The signals represent a scene having a grey area 31 to one side, a lighter grey area 32 in the middle and a white area 33 to the other side. Between these areas 31, 32 and 33 are two black areas 34, 35. Such a signal, if applied between the terminals 10, 11 of FIGURE 2 would give rise to a signal of the kind shown in FIGURE 4*b* between the output terminals 22, 23. In this latter figure the line synchronising pulses are in the form of bursts 40 of sinusoidal voltage due to the action of the burst modulator 21. The grey, light grey and white picture areas 31, 32 and 33 are unchanged but the black areas 34, 35 are now, by reason of the action of the unidirectional voltage pulse generator 17 and black clipper 19, in the form of the pulses 44, 45.

Figure 4B:
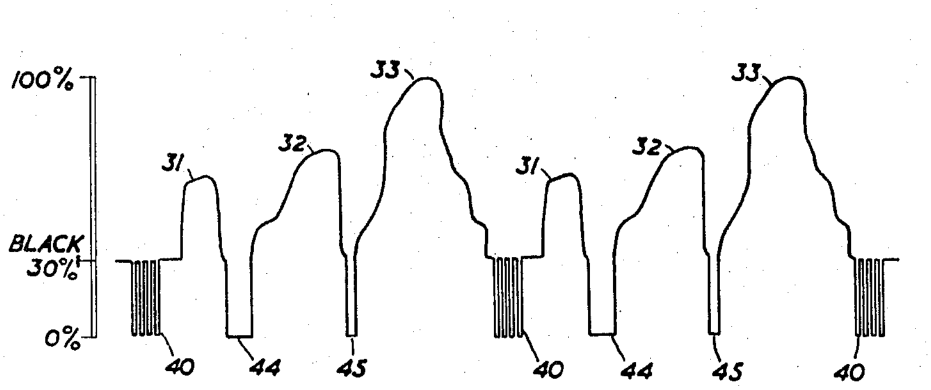

When signals of the waveform of FIGURE 4*b* are received on a television receiver equipment designed to receive television signals having the waveform of FIGURE 4*a* its operation is upset, particularly in respect of the synchronisation of its line time base and the pictures produced on such a receiver will be regarded as unacceptable by viewers. The pulses 44, 45 will upset the operation not only of those television receiver equipments which have a simple synchronised oscillator for generating the line scanning waveform but also of those having frequency maintaining arrangements associated with the line oscillator and which arrangements are sometimes referred to as "flywheel synchronisation." In this respect the invention is equally applicable to both 405 line and 625 line television systems.

A special receiving apparatus is necessary to provide acceptable pictures from a television signal having the waveform of FIGURE 4*b* and such an apparatus will be described in connection with FIGURE 3. This apparatus is arranged first to receive by wire or radio the modulated carrier wave, amplify and demodulate the same to provide a signal having a wave form of the kind shown in FIGURE 4*b* for application between the terminals 50, 51 of FIGURE 3. Signals applied between these terminals are fed to a video/pulse separator device 52 which is arranged to provide video signals on the line 53 and on the line 54 both the unidirectional voltage pulses due to the pulse generator 17 in the transmitting means and the pulses comprising bursts of sinusoidal voltage due to the pulse generator 21. There two types of pulses are applied to a filter device 55 which is arranged to pass only the sinusoidal voltage of the bursts which form the synchronising pulses. The sinusoidal voltage bursts are passed, by way of the line 56 to a demodulator 57 so that they appear on the line 58 as unidirectional voltage pulses. The signals on the lines 53 and 58 are both applied to a combining device 59 which provides in response thereto an output signal between the terminals 60, 61 which has the form shown in FIGURE 4*a*. Such signal may then be utilised in known manner to form a television picture.

Figure 3:
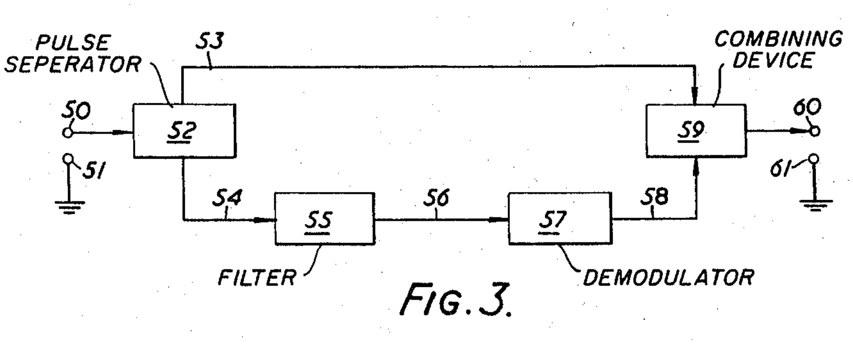
FIGURE 3 is a block schematic diagram of a receiving apparatus suitable for use in the system of FIGURE 1.

If desired the arrangements of FIGURE 3 may be incorporated in a complete television receiving apparatus or may take the form of a separate unit associated with a conventional television receiver equipment. In either case the effectiveness or otherwise of the arrangments may be made conditional upon the user of the receiver having satisfied a demand by the organiser of the broadcasting system for a particular fee. Such conditional effectiveness may be controlled either by a coin-actuated mechanism or the like, or by a personally or otherwise operable debit-registering mechanism.

It will be appreciated that various modifications may be made to the arrangements described above. For example the pulses additional to the synchronising pulses may take other forms provided that their frequency components fall within the video band and may be chosen to produce the maximum disturbing effect on the operation of conventional television receivers. Further, the form and frequency of the sinusoidal voltage bursts forming the synchronising signals could be different since their function is to convey only the synchronising pulse timing information, the pulses themselves being re-formed at each receiver of the kind described in connection with FIGURE 3. If desired the frequency of these sinusoidal voltage bursts could be modulated with informaiton concerning the programme price, and with a programme announcements signal, thus avoiding the need for separate control and announcement channels between the transmitting and receiving stations.

Although in general it is not considered satisfactory to operate a wired television system at video frequency, that is to say to apply the video signals directly to the wire network instead of using them to produce modulation of a carrier wave which is then applied to the network, such a video frequency system might be adopted in respect of a small network, for example a network for television signal distribution within a block of flats. Therefore, it is to be understood that the present invention is equally well applicable to such video frequency systems, in which case for example the bursts of sinusoidal voltage pertaining to the synchronising pulses and additional unidirectional voltage pulses would be applied directly (not as modulation of a carrier wave) to the signal distributing network.

A feature of the embodiments described above is that the picture is rendered intelligible in the receiver apparatus without a requirement for an extra signal path between the transmitter and the receiver for unscrambling signals or the like.

It is to be understood that although in the foregoing particular description the additional pulses are analogous to the line synchronising pulses of a normal television broadcast transmission, in other embodiments of the invention the additional pulses could be analogous to the frame synchronising pulses of a normal television transmission and in such a case the frame synchronising signals pertaining to the system will be transmitted as alternating current bursts.

Instead of lying wholly within the blacker than black level as shown in FIGURE 4*b*, the sinusoidal synchronising pulses 40 may extend into the grey level, in fact they may even be centred on black level and so extend as much above it as below it.

Another variation is aimed at increasing the unintelligibility of the pictures reproduced before payment, when the scenes transmitted are such that black level rarely occurs in the video signals. In this variation, the video signals are modified to indicate black level at additional instants not determined by the picture transmitted. Preferably these artificial black indications are introduced at instants corresponding to arbitrary positions towards the side edges of the pictures. Before normal reproduction is paid for, the artificial black incidences cause additional line mis-synchronisations and so render the picture more distorted, while after payment the picture is at worst darkened near the sides only.

I claim:

1. In a television system, in combination, transmitter means including a source of a video signal including a picture signal component representing an image and synchronizing signals of predetermined nature and timing; signal altering means operable to replace said synchronizing signals by modified synchronizing signals having the timing of said synchronizing signals and having a nature different from that of said synchronizing signals to develop an altered video signal; decoy signal insertion means operable to add to said altered video signal decoy signals having the nature of said synchronizing signals and having a timing different from that of said synchronizing signals to develop a modified video signal; means for transmitting said modified video signal to each of a plurality of receiving positions; apparatus at a said receiving position including a picture reproducing device operable by picture signals and synchronizing signals to reproduce said image; means for deriving a picture signal from said modified video signal; means for applying said picture signal to said picture reproducing device; synchronizing signal reconstituting means responsive to said modified video signal to derive therefrom reconstituted synchronizing signals having said predetermined nature and timing; and means for applying said reconstituted synchronizing signals to control the operation of said picture reproducing device; said synchronizing signal reconstituting means being insensitive to said decoy signals.

2. The system as claimed in claim 1 wherein said transmitter means comprises a source of video signals including picture signals occupying a first predetermined amplitude range and synchronizing signals of predetermined nature and timing occupying a second predetermined amplitude range adjacent to but exclusive of said first amplitude range; separator means operating to remove said synchronizing signals from said video signal; modified synchronizing signal generator means responsive to said separated synchronizing signals to develop modified synchronizing signals having said predetermined timing and having a nature differing from that of said synchronizing signals; means operable to add said modified synchronizing signals to said picture signal; decoy signal generating means developing signals having said predetermined nature and having a timing other than said predetermined timing; and decoy signal insertion means operating to add said decoy signals to said picture signal.

3. The system as claimed in claim 2 wherein said decoy signal generating means responds to the attainment by said picture signal of a limiting value of said first amplitude range to develop a said decoy signal.

4. The system as claimed in claim 3 wherein said limiting value is that separating said first and second amplitude ranges.

5. Video signal transmitter means comprising a source of video signals including picture signals occupying a first predetermined amplitude range and synchronizing signals of predetermined nature and timing occupying a second predetermined amplitude range adjacent to but exclusive of said first amplitude range; separator means operating to remove said synchronizing signals from said video signal; modified synchronizing signal generator means responsive to said separated synchronizing signals to develop modified synchronizing signals having said predetermined timing and having a nature differing from that of said synchronizing signals; means operable to add said modified synchronizing signals to said picture signal; decoy signal generating means developing signals having said predetermined nature and having a timing other than said predetermined timing; and decoy signal insertion means operating to add said decoy signals to said picture signal.

6. Video signal transmitter means as claimed in claim 5 wherein said modified video signals comprise bursts of sinusoidal voltage occupying said second amplitude range.

7. Television receiver apparatus comprising, in combination: means for receiving a modified video signal including picture signals occupying a first predetermined range, modified synchronizing signals comprising bursts of sinusoidal voltage having predetermined timing, and decoy signals comprising unidirectional voltage pulses occupying a second predetermined amplitude range adjacent to but exclusive of said first amplitude range; separator means responsive to said modified video signal to derive said picture signal therefrom; picture signal reproducing means responsive to picture signals and sychronizing signals comprising unidirectional voltage pulses in said second amplitude range; demodulator means responsive to said modified synchronizing signals for developing synchronizing signals comprising unidirectional voltage pulses in said second amplitude range; said demodulator means being insensitive to said decoy signals; and means applying said picture signals and said synchronizing signals to said picture reproducing means.

References Cited by the Examiner

UNITED STATES PATENTS

| | | | |
|---|---|---|---|
| 2,510,046 | 5/1950 | Ellett | 178—5.1 |
| 3,116,363 | 12/1963 | Doundoulakis | 178—5.1 |

DAVID G. REDINBAUGH, *Primary Examiner.*

H. W. BRITTON, *Assistant Examiner.*